(12) United States Patent
Migdal et al.

(10) Patent No.: US 12,151,650 B2
(45) Date of Patent: Nov. 26, 2024

(54) RUNNING BOARDS AND PROCESSES FOR THE PRODUCTION THEREOF

(71) Applicants: PLASAN SASA LTD., M.P. Marom Hagalil (IL); Sarit Aizik, Or Yehuda (IL)

(72) Inventors: Avi Migdal, Shlomi (IL); Vadim Favorsky, Maalot-Tarshiha (IL); Felix Aizik, M.P. Marom Hagalil (IL)

(73) Assignee: PLASAN SASA LTD., M.P. Marom Hagalil (IL)

( * ) Notice: Subject to any disclaimer, the term of this patent is extended or adjusted under 35 U.S.C. 154(b) by 267 days.

(21) Appl. No.: 17/608,887

(22) PCT Filed: May 8, 2019

(86) PCT No.: PCT/IL2019/050527
§ 371 (c)(1),
(2) Date: Nov. 4, 2021

(87) PCT Pub. No.: WO2020/225803
PCT Pub. Date: Nov. 12, 2020

(65) Prior Publication Data
US 2022/0297606 A1   Sep. 22, 2022

(51) Int. Cl.
*B60R 3/00* (2006.01)
*B60R 3/02* (2006.01)
*B60R 9/02* (2006.01)

(52) U.S. Cl.
CPC ............... *B60R 3/002* (2013.01); *B60R 3/02* (2013.01); *B60R 9/02* (2013.01)

(58) Field of Classification Search
CPC ............. B60R 3/002; B60R 3/02; B60R 9/02
USPC ......................................................... 280/163
See application file for complete search history.

(56) References Cited

U.S. PATENT DOCUMENTS

| 4,292,898 A | 10/1981 | Gordon et al. |
| 5,403,062 A | 4/1995 | Sjostedt et al. |
| 5,653,075 A * | 8/1997 | Williamson ............... E06B 3/86 52/794.1 |

(Continued)

FOREIGN PATENT DOCUMENTS

| AU | 2007285017 A1 | 2/2008 |
| CA | 2123621 A1 | 11/1995 |

(Continued)

OTHER PUBLICATIONS

Deaver, et al., "Use of Structural Long Glass Fiber Composites to Replace Steel in Automotive Running Boards", 2005 SAE World Congress, 2005, pp. 121-125.

(Continued)

*Primary Examiner* — Hau V Phan
(74) *Attorney, Agent, or Firm* — Dorsey & Whitney LLP (57) ABSTRACT

A running board comprising at least one composite material wherein the miming board is produced in a one continuous step pultrusion process wherein the pultrusion process parameters are selected to yield a miming board with specific one or more characteristics selected from dimensions, three dimensional shape, light weight/lightness, strength, fatigue, stiffness, rigidity, chemical resistance, fire resistance, reduced sensitivity to corrosion, UV resistance, thermal resistance, bending forces, impact resistance, wear resistance and visibility.

20 Claims, 7 Drawing Sheets

(56) References Cited

U.S. PATENT DOCUMENTS

| | | | |
|---|---|---|---|
| 6,050,579 A * | 4/2000 | Selland | B60R 3/002 |
| | | | 296/204 |
| 6,203,040 B1 | 3/2001 | Hutchins | |
| 6,219,987 B1 * | 4/2001 | Trent | E04C 2/425 |
| | | | 52/802.11 |
| 6,513,821 B1 | 2/2003 | Heil | |
| 7,000,932 B2 * | 2/2006 | Heil | B60R 3/002 |
| | | | 280/163 |
| 9,676,338 B2 | 6/2017 | Chapman et al. | |
| 10,968,090 B2 * | 4/2021 | McKinney | B66F 11/04 |
| 2006/0249924 A1 * | 11/2006 | Armstrong | B60R 3/002 |
| | | | 280/163 |
| 2010/0210745 A1 * | 8/2010 | McDaniel | C09D 7/48 |
| | | | 521/55 |
| 2012/0097194 A1 * | 4/2012 | McDaniel | A01N 63/50 |
| | | | 435/197 |
| 2013/0323454 A1 * | 12/2013 | Chapman | B29C 49/20 |
| | | | 428/74 |
| 2016/0355137 A1 | 12/2016 | Smith | |
| 2016/0355138 A1 * | 12/2016 | Smith | B60R 3/002 |
| 2018/0345868 A1 * | 12/2018 | Dellock | B29C 48/0019 |
| 2019/0185068 A1 * | 6/2019 | Mullen | B62D 25/142 |

FOREIGN PATENT DOCUMENTS

| | | |
|---|---|---|
| CN | 108216045 A | 6/2018 |
| DE | 102011015160 A1 | 9/2012 |
| WO | 2007036037 A1 | 4/2007 |
| WO | 2013115903 A1 | 8/2013 |
| WO | 2014049570 A2 | 4/2014 |

OTHER PUBLICATIONS

Ruhmnann, "The Design, Fabrication and Testing of the Glasshopper Prototype Covered Hopper Rail Cars", Composite Structures, 1994, pp. 207-213.

* cited by examiner

RUNNING BOARDS AND PROCESSES FOR THE PRODUCTION THEREOF

TECHNOLOGICAL FIELD

The present invention relates to running boards and processes for the preparation thereof.

BACKGROUND ART

Running boards are used as steps fitted under the side door of a vehicle e.g., a car or a truck, supporting a vehicle occupant's foot during entry or exit of a lateral side door of the vehicle, in particular high vehicle.

Various running boards and processes for the preparation thereof are known in the art [1]-[8].

REFERENCES

[1] US 2016/0355138
[2] US 2013/0323454
[3] US 2006/0249924
[4] U.S. Pat. No. 7,000,932
[5] U.S. Pat. No. 6,050,579
[6] WO 2007/036037
[7] U.S. Pat. No. 6,219,987
[8] Dann Deaver and Joshua McIlvaine, GE Advanced Materials, "Use of Structural Long Glass Fiber Composites to Replace Steel in Automotive Running Boards" 2005 SAE World Congress, Detroit, Michigan April 11-14, 2005.

SUMMARY OF THE INVENTION

Running boards of the present invention are produced in a one-step pultrusion process from composite materials which endow them with a plurality of advantages, amongst them, relatively low weight (which may be directly related to reduction of pollution and emission of fuel), high strength, high fatigue, corrosion resistance and other benefits as detailed herein below.

Thus, according to one of its aspects the present invention provides a running board consisting of at least one composite material, said running board being produced by pultrusion, in one continuous process step.

According to another one of its aspects the present invention provides a running board consisting of at least one composite material wherein said running board is produced in one continuous pultrusion step process, wherein the pultrusion process parameters are selected to yield a running board with specific one or more characteristics selected from dimensions, three dimensional shape, light weight/lightness, strength, fatigue, stiffness, rigidity, chemical resistance, fire resistance, reduced sensitivity to corrosion, UV resistance, thermal resistance, bending forces, impact resistance, wear resistance and visibility.

According to a further one of its aspects the present invention provides a running board comprising at least one composite material wherein said running board is produced in one continuous pultrusion step process, wherein the pultrusion process parameters are selected to yield a running board with specific one or more characteristics selected from dimensions, three dimensional shape, light weight/lightness, strength, fatigue, stiffness, rigidity, chemical resistance, fire resistance, reduced sensitivity to corrosion, UV resistance, thermal resistance, bending forces, impact resistance, wear resistance and visibility, optionally wherein the running board is free of any metallic segments or parts.

Yet according to a further one of its aspects the present invention provides a running board as herein disclosed and/or exemplified.

According to a further one of its aspects the present invention provides a process for manufacturing a running board, the process comprising pultruding (by means of pultrusion) at least one composite material, as defined herein, to afford a running board consisting said composite material and having a predetermined form (e.g., shape and size).

Yet, according to a further one of its aspects the present invention provides a process for manufacturing a running board, the process comprising pultruding at least one composite material under preselected pultrusion conditions to afford a running board consisting said composite material and having a predetermined form (e.g., shape and size).

According to yet a further one of its aspects the present invention provides a process for manufacturing a running board according to the present invention, the process comprising pultruding at least one composite material under preselected pultrusion conditions, to afford a running board consisting said composite material and having a predetermined shape and size.

According to a further one of its aspects the present invention provides a process for manufacturing a running board as herein described, the process being a one continuous step pultrusion process.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF THE INVENTION

The present invention relates to running boards and processes for the preparation thereof.

As used herein the term "running board" refers to a step fitted under the side door and/or the back door of a vehicle, supporting a vehicle occupant's foot during entry or exit of a lateral side door or back door of the vehicle, in particular high vehicle. Such boards may also be used as entrance platforms.

The running boards of the present invention are manufactured by pultrusion as one piece products, made of composite materials.

In some embodiments the running boards according to the present invention are free of metal parts.

The running boards are mounted on the vehicle via a connecting unit e.g., brackets, that may be of at least one metal. In some embodiments the metallic parts, such as screws which may be made of steel or other metals, do not form part of the running board according to the present disclosure.

In some embodiments, the running board of the present invention consists of one or more composite material. To this end the running board is referred to as a composite running board.

In some embodiments, the running board of the present invention consists of one or more composite materials and is produced in one piece, in a single pultrusion process step. To this end the running board is referred to as a composite pultruded running board.

At times, the composite running boards according to the present invention may be further processed. For example, the running boards produced in the pultrusion process may be further equipped with one or more step pads and/or one or more end cups.

The running board according to the present invention may be provided at a wide range of designs.

At times, the pultrusion process according to present invention may be set up to produce a running board with bending features e.g., for aesthetic purposes and/or for functional purposes such as fitting onto the vehicle body. Also at times the running boards produced in the pultrusion process may be further subjected to bending forces (e.g., by utilizing heat) and bent at specific positions (post the pultrusion process).

Post treatment of the composite running boards may also include covering of the running board with a coating layer. Non limiting example of such coating are coloring layer e.g., for aesthetic purposes and/or UV resistant covering layer for protection against UV.

The running board according to the present invention may be of any design and shape.

In some embodiments the running boards according to the present invention may have a structure with one or more cavities, as illustrated herein below, which may run the full length of the running board, may be positioned or formed at selected regions of the running board and may be of any size and shape. Typically, the cavities are present within the circumference of the board and define an inner cavity which may or may not be filled after the board is formed or during the pultrusion process.

The one or more cavities of the three dimensional composite running board may be filled with one or more light weigh materials (referred to herein as core materials) such as foams e.g., to provide the boards with increased strength and/or stiffness. At times the pultrusion process may be set up to fill the cavities during the process itself. Alternatively, the cavities of the running board may be filled with one or more core materials post the pultrusion process.

Thus, according to one of its aspects the present invention provides a running board consisting of at least one composite material, said running board being produced by pultrusion, in one continuous process step.

According to another of its aspects the present invention provides a running board consisting of at least one composite material wherein said running board is produced in one continuous pultrusion step process, wherein the pultrusion process parameters are selected to yield a running board with specific one or more characteristics selected from dimensions, three dimensional shape, light weight/lightness, strength, fatigue, stiffness, rigidity, chemical resistance, fire resistance, reduced sensitivity to corrosion, UV resistance, thermal resistance, bending forces, impact resistance, wear resistance and visibility.

According to yet another one of its aspects the present invention provides a running board comprising at least one composite material wherein said running board is produced in one continuous pultrusion step process, wherein the pultrusion process parameters are selected to yield a running board with specific one or more characteristics selected from dimensions, three dimensional shape, light weight/lightness, strength, fatigue, stiffness, rigidity, chemical resistance, fire resistance, reduced sensitivity to corrosion, UV resistance, thermal resistance, bending forces, impact resistance, wear resistance and visibility. In some embodiments the running board may be free of any metallic segments or parts.

According to another one of its aspects the present invention provides a process for manufacturing a running board, the process comprising pultruding (by means of pultrusion) at least one composite material, as defined herein, to afford a running board consisting said composite material and having a predetermined form (e.g., shape and size).

Yet according to a further one of its aspects the present invention provides a process for manufacturing a running board according to the present invention, the process comprising pultruding at least one composite material under preselected pultrusion conditions, to afford a running board consisting said composite material and having a predetermined shape and size.

According to a further one of its aspects the present invention provides a process for manufacturing a running board as herein described, the process being a one continuous step pultrusion process.

In some embodiments of the present invention the pultrusion process parameters are selected to yield a running board with characteristics specifically adapted for the particular use, and may be selected from the group consisting of dimensions (e.g., to fit the vehicle requirements); three dimensional shape; light weight/lightness (e.g., as compared to metal comprising running boards made of e.g., polished stainless steel, chromed steel, black powder coated Al and others); strength (e.g., to meet costumer and/or standard requirements); fatigue (e.g., resistance to dynamic occurrences such as cumulative application of loading forces/pressure and/or vibrations according to costumer and/or standard requirements); stiffness; rigidity; chemical resistance; fire resistance (e.g., minimal release of toxic materials when burned); reduced sensitivity to corrosion (e.g., compared to metallic cardboards); UV resistance; thermal resistance (heat/cold); impact resistance; wear resistance and/or resistance to other environmental conditions; bending forces (e.g., when the running board is post treated as detailed herein, the possibility of bending the cured composite material should exist); visibility (e.g., aesthetic appearance); and any combination thereof.

In some embodiments of the present invention, the pultrusion process parameters are selected to yield a running board with characteristics specifically adapted for the particular use, and may be selected from the group consisting of dimensions; three dimensional shape; light weight/lightness; strength; fatigue; stiffness; rigidity; chemical resistance; fire resistance; reduced sensitivity to corrosion; UV resistance; thermal resistance; impact resistance; wear resistance and/or resistance to other environmental conditions; visibility; and any combination thereof.

In some embodiments, the running board characteristics may be three dimensional shape.

In some embodiments, the running board characteristics may be light weight/lightness.

In some embodiments, the running board characteristics may be strength.

In some embodiments, the running board characteristics may be fatigue.

In some embodiments, the running board characteristics may be stiffness.

In some embodiments, the running board characteristics may be rigidity.

In some embodiments, the running board characteristics may be chemical resistance.

In some embodiments, the running board characteristics may be fire resistance.

In some embodiments, the running board characteristics may be reduced sensitivity to corrosion.

In some embodiments, the running board characteristics may be UV resistance.

In some embodiments, the running board characteristics may be thermal resistance.

In some embodiments, the running board characteristics may be impact resistance.

In some embodiments, the running board characteristics may be wear resistance.

In some embodiments, the running board characteristics may be resistance to environmental conditions.

In some embodiments, the running board characteristics may be visibility.

In some embodiments, the running board characteristics may be bending forces (e.g., bending the cured composite material post the pultrusion process and/or subjecting the composite material to bending forces during the pultrusion process).

As used herein the term "composite material" or any lingual variation thereof refers to a material made from two or more constituent materials with different physical or chemical properties (the different properties may be minor or significant) that, when combined, produce a material with characteristics different from the individual components. The individual components remain separate and distinct within the finished structure. Non limiting examples of composite materials are reinforced plastics, such as fiber-reinforced polymer.

In some embodiments of the present invention the composite material consists of at least one fibrous material, at least one resin, and optionally at least one additive (which may form part of the at least one fibrous material and/or of the at least one resin).

In some embodiments the additive material forms part of the composite material.

As used herein the "pultrusion" process refers to a continuous process for the manufacture of composite materials with pre-defined or constant cross-section. The pultrusion process according to the present invention may be modified or tuned to meet processing requirements relating to, inter alia, any one characterizing parameter or feature associated with the end product, the material composition of the composite, the physical dimensions of the products, etc. Generally speaking, a person of skill would understand that any processing manipulation known for the pultrusion process may be adapted or otherwise utilized in the process of the present invention.

As noted herein, the pultrusion process for manufacturing running boards according to the present invention utilizes one or more fibrous materials (and optionally at least one additional material) which are impregnated with at least one resin (and optionally at least one additional material) while being continuously pulled (the pulling strength being adjusted to be compatible with the mechanical features of the one or more fibrous materials) at a specific temperature and pulling rate (and other parameters which are determined to be compatible with the chemical and/or physical characteristic features of the at least one resin), resulting with fibers soaked with resin (and optionally at least one additional material) which are died (e.g., by utilizing a metal die with the desired shape, wherein said soaked fibers are pulled through said die) and cured to produce the final composite pultruded running board. The curing of the resin soaked fibers may be conducted by one or more of heating, UV radiation or any other method known in the art. In some embodiments the heating may be performed by using an oven. In some embodiments the heating may be performed by utilizing a heated die e.g., by flowing hot liquids through the die. In some embodiments, wherein the composite running board has one or more three dimensional cavities, the pultrusion continuous process may also encompass filling of said cavities. In some embodiments, wherein the composite running board has curvature characteristics, the pultrusion continuous process may also apply means to achieve these curvature characteristics.

Figure 1A:
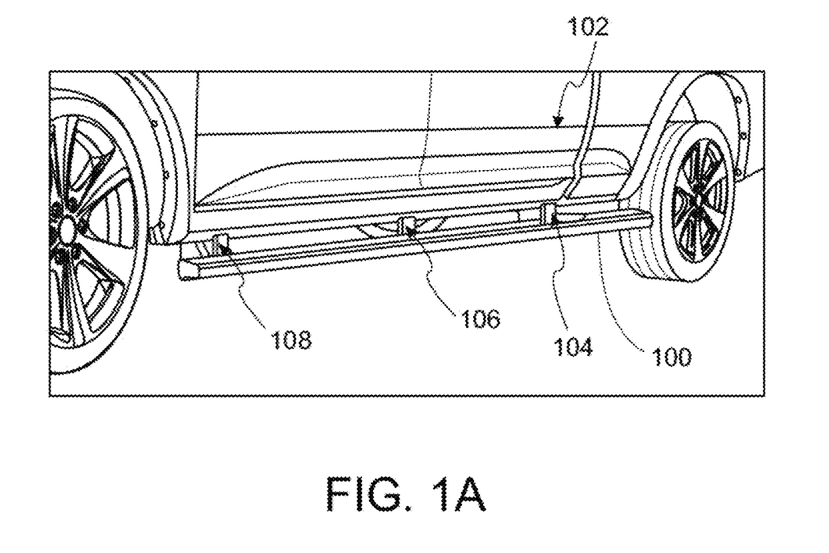
FIG. 1A-1B represent an exemplary picture of a running board and an exemplary schematic illustration of a running board, respectively, according to some embodiments of the present invention.

FIG. 1A represents a picture of a running board (100) according to some embodiments of the invention. The running board (100) is mounted onto the vehicle (102) at three positions (104, 106 and 108). It is noted that mounting of the running board onto the vehicle may be at two, three, or four points or any other number of points as required according to the vehicle and the running board configuration.

Figure 1B:
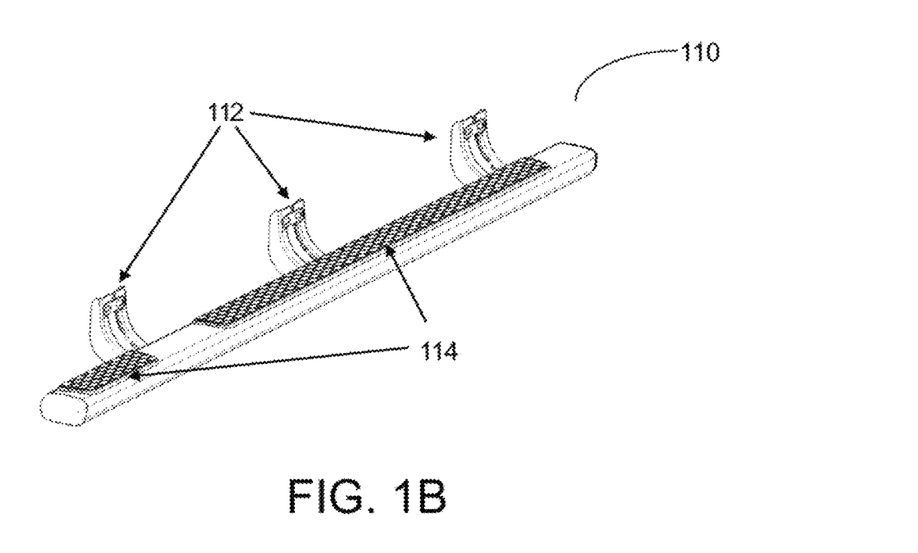

FIG. 1B represents a scheme of an exemplary running board (110) according to some embodiments of the invention. The running board has three positions via which it is connected to the vehicle (illustrated in the figure by exemplary arrows 112). The number of the connection points may depend on the size of the vehicle and/or the size of the running board. The running board may be designed to include one or more rough areas or added one or more step pads on the upper surface thereof to assist in avoiding slipping of the vehicle's occupant while entering or exiting the vehicle (illustrated in the figure by exemplary arrows 114).

In some embodiments the one or more rough areas on the upper surface of the running board may be produced during the pultrusion process or post the pultrusion process.

The running boards according to the present invention may have a cross-section of various shapes and sizes. The cross section of the running board may adapt a shape selected from (but not limited to) round, square, rectangular and triangular.

Figure 2A:
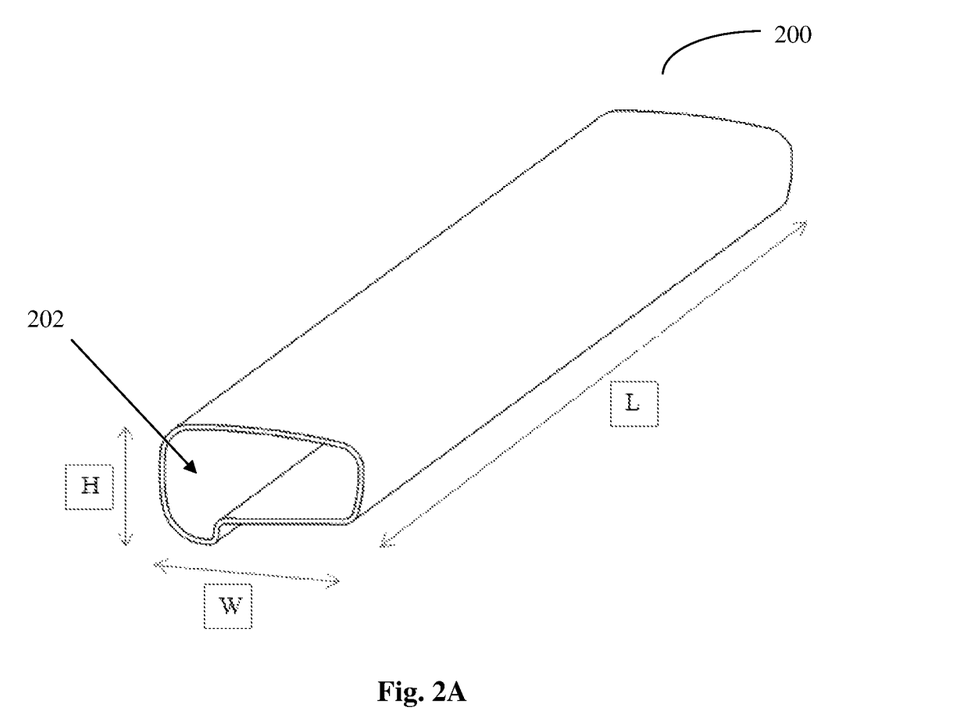
FIG. 2A-2B represent exemplary schematic illustrations of running boards according to some embodiments of the present invention.

FIG. 2A represents a schematic illustration of a running board (200) according to some embodiments of the invention. The length, height and width are represented in the figure by (L), (H) and (W), respectively.

In some embodiments the running board according to the present invention may contain one or more structural cavities. One structural cavity is illustrated in FIG. 2A as 202.

In some embodiments the running board may have two cavities. In some embodiments the running board may have three cavities. In some embodiments the running board may have four cavities or more.

The number of the cavities in the structure of the running boards according to the present invention may be determined based on the required specific characteristics of the running board such as but not limited to strength, fatigue, stiffness, rigidity etc.

At times the running board according to the invention may have one or more cavities, wherein the one or more cavities may be filled with one or more core materials (e.g., foams). Non-limiting examples of core materials are one or more of polyurethane, balsa, styrene acrylonitrile (SAN) foam, polyvinyl chloride (PVC) foam and polyethylene.

In some embodiments the one or more cavities may be filled during the pultrusion process e.g., with balsa and/or one or more foam materials.

In some embodiments the one or more cavities may be filled post the pultrusion process.

In some embodiments wherein the running board has two or more cavities, the running board may be processed (during or post the pultrusion process) to fill the two or more cavities with one or more core materials which may be same or different in each cavity.

Figure 2B:
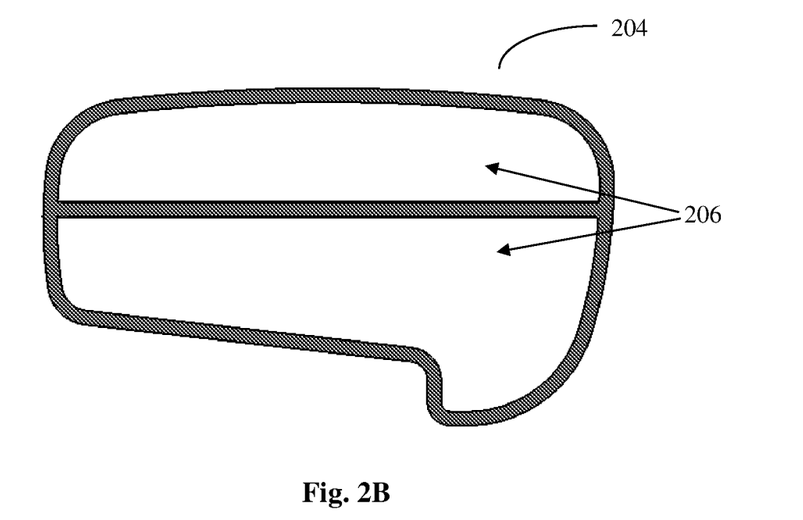

FIG. 2B represents an exemplary schematic illustration of an inside view of a structure of a running board (204) according to some embodiments of the invention. The structure of the running board has two exemplary cavities represented by arrows (206).

In some embodiments the two (or more) structural cavities of the running board according to the invention may be oriented with respect to each other in different directions and configurations.

In some embodiments according to the invention the size of the running board may be as follows: 2649 mm Length (L); 72.5 mm Height (H); and 122.5 mm Width (W).

In some embodiments the length of the running board may be of about 600 mm and up to about 3500 mm long.

In some embodiments the width of the running board may be of about 50 mm and up to about 300 mm.

In some embodiments the height of the running board may be of about 20 mm and up to about 150 mm.

In some embodiments the thickness of the running board may be of about 1.5 mm and up to about 30 mm.

In a specific embodiment the thickness of the running board is 3±0.2 mm. As used herein the term "about" indicates ±20% of the specified values.

Figure 3:
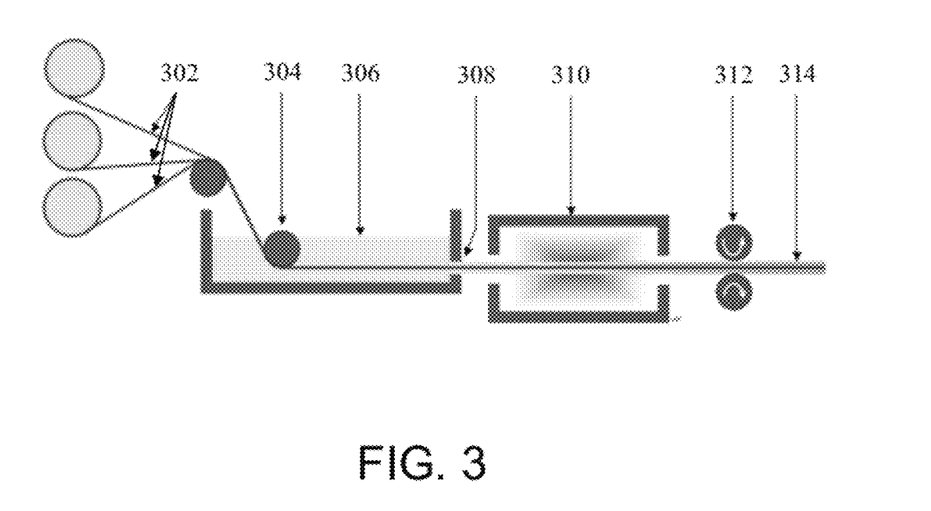
FIG. 3 represents an exemplary diagram of a pultrusion process according to some embodiments of the present invention.

FIG. 3 represents an exemplary diagram of a pultrusion process (300) according to some embodiments of the invention. In the process a continuous roll of one or more fibers mats (302) is tensed through a tension roller (304) via a resin impregnator (306) to produce a resin soaked fiber (308) which is died and heated in a die and heat source (310). Throughout the process a pull mechanism (312) is utilized. The process results with a finished hardened fiber reinforced polymer (314).

In some embodiments according to the present invention the process results with a final product which is a running board consisting of a composite material. It is noted that the pultrusion process may further comprise other variants known in the art. Non limiting example of such variants are UV curing, heat curing e.g., by using a heated die or by using an oven, etc.

In some embodiments the pultruded composite running board may be further post treated as herein described e.g., curved, coated, filled with core material/s etc.

In some embodiment the running boards according to the present invention are produced by a pultrusion process which utilizes one or more fibrous material selected from carbon/graphite fiber, fiberglass/glass fiber (e.g., E-glass, S-glass, S2-glass, C-glass), aramid fibers, poly-propylene fibers or polyethylene.

In some embodiments the fibrous material may be carbon/graphite fiber, fiberglass/glass fiber (e.g., E-glass, S-glass, S2-glass, C-glass), aramid fibers, poly-propylene fibers, polyethylene or any combination thereof.

In some embodiment the fibrous material may be carbon/graphite fiber.

In some embodiment the fibrous material may be fiberglass (e.g., any one of E-glass, S-glass, S2-glass and C-glass). At times the fibrous material may be a combination of one or more fiberglass (e.g., E-glass, S-glass, S2-glass, and C-glass).

In some embodiment the fibrous material may be a hybrid of fiberglass (e.g., E-glass) and carbon.

In some embodiment the fibrous material may be a hybrid of fiberglass (e.g., E-glass) and aramid fibers.

In some embodiment the fibrous material may be aramid fibers.

In some embodiment the fibrous material may be polypropylene fibers.

In some embodiment the fibrous material may be polyethylene.

The fibrous material may be of any form or shape.

In some embodiments the fibrous material may further comprise one or more additional materials (additives) which form part of the composite material.

In some embodiments the fibrous material may be provided in one or more shapes of textiles. Non limiting examples of such textiles are surface veils, stitched long fiber math, long fiber math, continuous strand mat [e.g., stitched continuous strand mat (wherein the fibers are stitched), and bonded continuous strand mat (wherein the fibers are bonded by e.g., a binder)], chopped strand mat (CSM) or chopped reinforcements, woven reinforcements, continuous roving reinforcements, knitted reinforcements, surface veils, carbon veils and non-crimp fabrics (NCF).

In some embodiments the textile is NCF.

Figure 4:
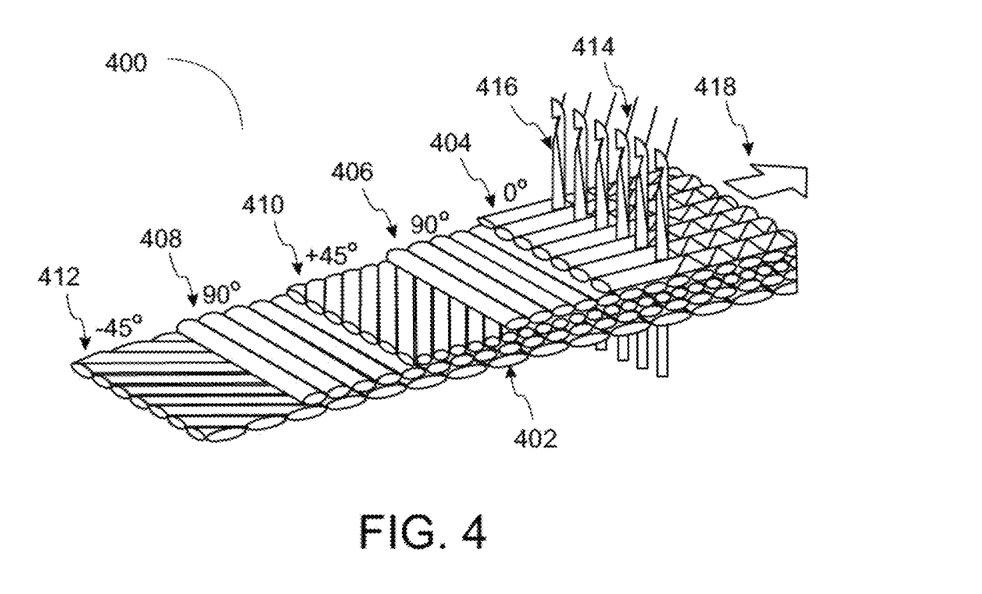
FIG. 4 represents an exemplary schematic illustration of Non-Crimp Fabrics (NCF) according to some embodiments of the present invention.

FIG. 4 represents an exemplary schematic illustration of NCF (400): 402 represents a fiber. 404 shows fibers in 0° direction (straight fiber pulling), 406 and 408 show fibers in 90°, 410 shows fibers in +45°, 412 shows fibers in −45°. 414 illustrates the stitching process and 416 illustrates the needle. The arrow 418 represents the direction of the pulling in the pultrusion process which utilizes the fabric. The orientation of the fibers in the fabric is maintained during the pultrusion process. It is noted that the stitching of the fabrics layers enables maintaining the orientation/direction of the fibers while being pulled in the pultrusion process.

In some embodiments of the invention the fibers are stitched.

In some embodiments of the invention the fibers are bonded e.g., by a bonding material.

In some embodiments of the invention the orientation of the fibers e.g., NCF used in the pultrusion process to produce the running board of the invention may be one or more of 0° angle and any angle between about 15° to about 90°, at time between about 15° to about 85°, even at times between about 20° to about 90° e.g., 42°, 45°.

In some embodiments according to the invention the wires which are used in the stitching process are known in the art as attaching the fibers together to prevent any movement during the pultrusion process. Without wishing to be bound by theory, the inventors of the present invention have found that the wires also enable the resin which is used in the pultrusion process to penetrate into the space between the fabric wires and/or the fabric layers via capillary flow and hence to efficiently fill the space in between the fibers. To this end, the resin should be of specific viscosity to enable efficient penetration thereof into the fabric. Thus, in some embodiments of the invention the wires are considered as carriers which form part of the fibrous material. In some embodiments the wires form part of composite material.

Non limiting examples of the resin's viscosity are between about 300 cp to about 1000 cp.

In some embodiments the fibers of the fibrous material utilized in the pultrusion process are provided in a single layer form.

In some embodiments the fibers of the fibrous material utilized in the pultrusion process are provided in multi stacked layers form e.g., 2, 3, 4, 5, 6, 7, 8, 9, 10 layers etc.

In some embodiments the fiber of the fibrous material may be comprised of at least one filament.

In some embodiment the filament may be twisted or untwisted.

In some embodiments the fiber of the fibrous material may be comprised of multiple filaments. Non limiting examples are about 600 filaments, at times 1000 filaments and above, at times 1200 filaments and above, at times 4000 filaments and above, at times 24,000 filaments and above.

In some embodiments the fibers of the fibrous material utilized in the pultrusion process are provided in a 4 stacked layers wherein each fiber consists of about 4000 filaments.

Without wishing to be bound by theory, the density of the fibers and the number of the fibers and/or the number of the layers which constitute the fibrous material used in the pultrusion process according to the present invention my determine the thickness of the running board of the invention. For example, a fabric which is formed from 10 stacked layers may provide a thickness of 3 mm (depending on the size of the fiber). Accordingly, the characteristic features of the fibers used in the pultrusion process may affect the final properties of the produced running board. Further, the number of fibers/layers and/or the density thereof may determine the pulling force in the pultrusion process and as such affect the final properties of the produced running board.

In some embodiment the pultrusion process according to the present invention utilizes one or more resins selected from epoxy, polyurethane, polyester (e.g., orthophthalic, terephthalic, isophthalic), chlorendic polyester resin, dicyclopentadiene (DCPD), vinyl ester or phenolic ester.

In some embodiment the pultrusion process according to the present invention utilizes one or more resins selected from epoxy, polyurethane, polyester, chlorendic polyester resin, dicyclopentadiene (DCPD), vinyl ester, phenolic ester, polypropylene, polyethylene, Nylon, or peek.

In some embodiments the resin may further comprise one or more additional materials (additives) which form part of the composite material.

In some embodiments the resin may be an epoxy resin.

In some embodiments the resin may be polyurethane resin.

In some embodiments the resin may be polyester.

In some embodiments the resin may be polyester selected from orthophthalic polyester, terephthalic polyester or isophthalic polyester.

In some embodiments the resin may be chlorendic polyester.

In some embodiments the resin may be DCPD.

In some embodiments the resin may be vinyl ester.

In some embodiments the resin may be phenolic ester.

In some embodiment the pultrusion process according to the present invention may utilize one or more thermoset resins (e.g., epoxy, DCPD, vinyl ester and phenolic ester).

In some embodiment the pultrusion process according to the present invention may utilize one or more thermoplastic resins (e.g., polypropylene, Polyethylene, Nylon, and peek). To this end, the running board may be further processed following the pultrusion process e.g., post treated by heating for curving purposes which may provide the board with aesthetic and/or functional features.

In some embodiment the pultrusion process according to the present invention may utilize one or more resins which may be both thermoset and thermoplastic (e.g., polyurethane resin and polyester).

Without wishing to be bound by theory, the selection of resins in the pultrusion process of the invention may be affected by the required environmental conditions. For example, polyester resin or variants thereof may be compatible (e.g., resistant) with temperatures of up to about 90° C. or up to about 180° C., respectively, which may be utilized in the protrusion process of the invention. In some embodiments the resin may be a vinyl ester resin which may be compatible with a temperature of up to about 120° C.

In some embodiments the resin may be resistance to temperature of up to about 70° C.

In some embodiments the resin may be resistance to temperature of up to about 215° C.

It is noted that the fibrous materials and the resins which built the running boards according to the present invention have to be compatible with each other to produce the required features of the running board.

Accordingly, in some embodiments the pultrusion process utilizes a combination of specific fibrous material/s compatible with specific resin/s and vice versa. In some embodiments the specific concentrations of the fibrous material/s and the resin/s are envisaged as a parameter of the pultrusion process. Further, at times selection of the fabric and the resin would determine the density of the fabric and hence the properties of the final product.

In some embodiments the running board according to the present invention consists of at least one composite material, wherein the composite material consists of one or more fibrous materials selected from carbon/graphite fiber, fiberglass/glass fiber (e.g., E-glass, S-glass, S2-glass, C-glass), aramid fibers, poly-propylene fibers or polyethylene and one or more resins selected from epoxy, polyurethane, polyester (orthophthalic, terephthalic, isophthalic), chlorendic polyester resin, dicyclopentadiene (DCPD), vinyl ester or phenolic ester.

In some embodiments the at least one composite material consists of fiberglass and polyester.

In some embodiments the at least one composite material consists of E-glass and polyester.

In some embodiments the at least one composite material consists of E-glass and vinyl ester.

In some embodiments the at least one composite material consists of fiberglass (e.g., E-glass) and vinyl ester.

In some embodiments the at least one composite material consists of hybrid of fiberglass (e.g., E-glass) and carbon fibers, and vinyl ester.

In some embodiments the at least one composite material consists of hybrid of aramid fibers and carbon fibers, and vinyl ester.

In some embodiments the at least one composite material consists of fiberglass (e.g., E-glass) and polyester.

In some embodiments the at least one composite material consists of hybrid of fiberglass (e.g., E-glass) and carbon fibers, and polyester.

In some embodiments the at least one composite material consists of hybrid of fiberglass (e.g., E-glass) and aramid fibers, and polyester.

In some embodiments the at least one composite material consists of hybrid of aramid fibers and carbon fibers, and polyester.

In some embodiments the composite material may consist of carbon/graphite fiber, fiberglass/glass fiber (e.g., E-glass, S-glass, S2-glass, C-glass), aramid fibers, poly-propylene fibers, polyethylene fibers or any combination thereof and epoxy resin, polyurethane resin, polyester resin, chlorendic polyester resin, dicyclopentadiene (DCPD) resin, vinyl ester resin, phenolic ester resin or any combination thereof.

In some embodiments the composite material may consist of carbon/graphite fiber, fiberglass/glass fiber (e.g., E-glass, S-glass, S2-glass, C-glass), aramid fibers, poly-propylene fibers, polyethylene or any combination thereof and epoxy resin, polyurethane resin, polyester resin, chlorendic polyester resin, dicyclopentadiene (DCPD) resin, vinyl ester resin, phenolic ester resin, polypropylene, polyethylene, Nylon, peek or any combination thereof.

In some embodiments the running board according to the invention is produced from fiberglass and polyester.

In some embodiments the running board according to the invention is produced from fiberglass (e.g., E-glass) and polyester.

In some embodiments the running board according to the invention is produced from fiberglass (e.g., E-glass) and vinyl ester.

In some embodiments the running board according to the invention is produced from hybrid of fiberglass (e.g., E-glass) and carbon fibers, and vinyl ester.

In some embodiments the running board according to the invention is produced from hybrid of fiberglass (e.g., E-glass) and aramid fibers, and vinyl ester.

In some embodiments the running board according to the invention is produced from hybrid of aramid fibers and carbon fibers, and vinyl ester.

In some embodiments the running board according to the invention is produced from fiberglass (e.g., E-glass) and polyester.

In some embodiments the running board according to the invention is produced from hybrid of fiberglass (e.g., E-glass) and carbon fibers, and polyester.

In some embodiments the running board according to the invention is produced from hybrid of fiberglass (e.g., E-glass) and aramid fibers, and polyester.

In some embodiments the running board according to the invention is produced from hybrid of aramid fibers and carbon fibers, and polyester.

In some embodiments the running board according to the invention may be produced from fiberglass (e.g., E-glass), wherein 90% (at times 85%) of the fibers are fibers of 0° direction and 10% (at times 15%) of the fibers are stitched long fiber mat, and polyester.

In some embodiments the running board according to the invention may be produced from fiberglass (e.g., E-glass), wherein 90% (at times 85%) of the fibers are fibers of 0° direction and 10% (at times 15%) of the fibers are continuous strand mat, and polyester.

In some embodiments the fibers (e.g., fiberglass) constitute about 55% of the running board volume and the resin (e.g., polyester) constitutes about 45% of the running board volume.

In some embodiments the fibers (e.g., fiberglass) constitute about 55%, at times about 50%, even at times about 45% of the running board volume.

In some embodiments the resin (e.g., polyester) constitutes about 45%, at times about 50%, even at times about 55% of the running board volume.

In some embodiments the running board consists of 55% (volume) fiberglass and 45% polyester (volume), wherein about 90% (at times about 85%) of the fibers are fibers of 0° direction and about 10% (at times about 15%) of the fibers are continuous strand mat (at times stitched long fiber mat), wherein in some embodiments the running board is of 2649 mm length, 72.5 mm height, 122.5 mm width, thickness of 3±0.2 mm and weight of 9.6 lb. (4.35 kg).

In some embodiments the composite pultruded running board may have a weight which may be about 10%, at times about 20%, at times about 30%, at times about 40% and at time about 50% lower compared to the weight of traditional corresponding metal containing running boards.

In some embodiments, in the pultrusion process according to the present invention at least one fibrous material, selected as herein defined, with at least one resin material, selected as herein defined, and optionally at least one additive are combined to afford the composite material as herein defined.

In some embodiments, the constitution of the composite material and the pultrusion conditions according to the present invention (such as temperature, pulling rate and others) are selected or adapted or modified to meet one or more characteristics of the final running board product, as herein defined.

In some embodiments, the processing conditions according to the present invention are selected to yield a running board having a predetermined strength; fatigue; stiffness; rigidity; chemical resistance; fire resistance; reduced sensitivity to corrosion; UV resistance; thermal resistance; impact resistance; wear resistance and/or resistance to other environmental conditions; bending forces; visibility; and any combination thereof.

In some embodiments, the processing conditions according to the present invention are selected to yield a running board having a predetermined strength; fatigue; stiffness; rigidity; chemical resistance; fire resistance; reduced sensitivity to corrosion; UV resistance; thermal resistance; impact resistance; wear resistance and/or resistance to other environmental conditions; visibility; and any combination thereof.

In some embodiments, the processing according to the present invention comprises determining or setting the pultrusion temperature based on the selection of the at least one resin. In some embodiments, the pultrusion temperature (being the highest temperature utilized along the pultrusion process) is selected between about 70° C. and about 215° C. In some embodiments, the temperature is not higher than about 90° C., or about 120° C. or not higher than about 180° C.

DETAILED DESCRIPTION OF EMBODIMENTS

The following examples are not in any way intended to limit the scope of the invention as claimed.

EXAMPLE 1

Computerized Simulations for Selecting Fibers and Resins for the Production of the Running Board in the Pultrusion Process The inventors of the present invention have utilized a computerized simulation into which specific parameters of the running board product were provided, such as length, height, width, mounting points on the vehicle, positions onto which a pressure (according to standard or customer requirements) is applied and the desirable weight. Lists of various fibers and resins were used in the simulation. The simulation provided an output of compatible fibers and resins that may fulfill the required parameters. Accordingly, the program was used as a first filter to select combinations of fibers and resins to produce the desirable running board. The simulation provided the benefit of saving time and money.

At the next level the running boards with the specific fibers and resins were produced and the performance thereof was tested.

Figure 5A:
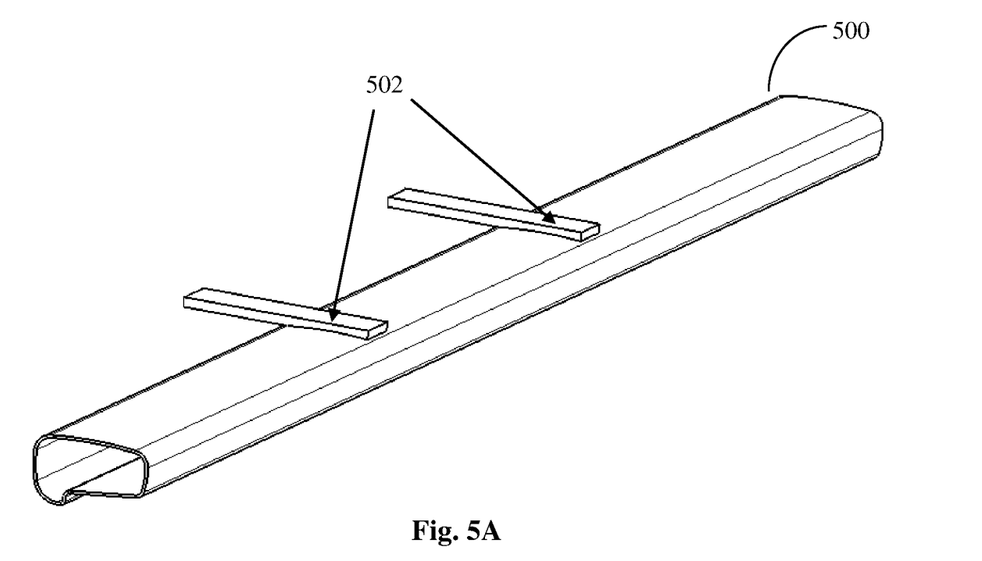
FIGS. 5A-5B represent an exemplary schematic illustration of top and bottom view, respectively, of a running board according to some embodiments of the present invention and positions of applied forces and mounting points, respectively.
Figure 5B:
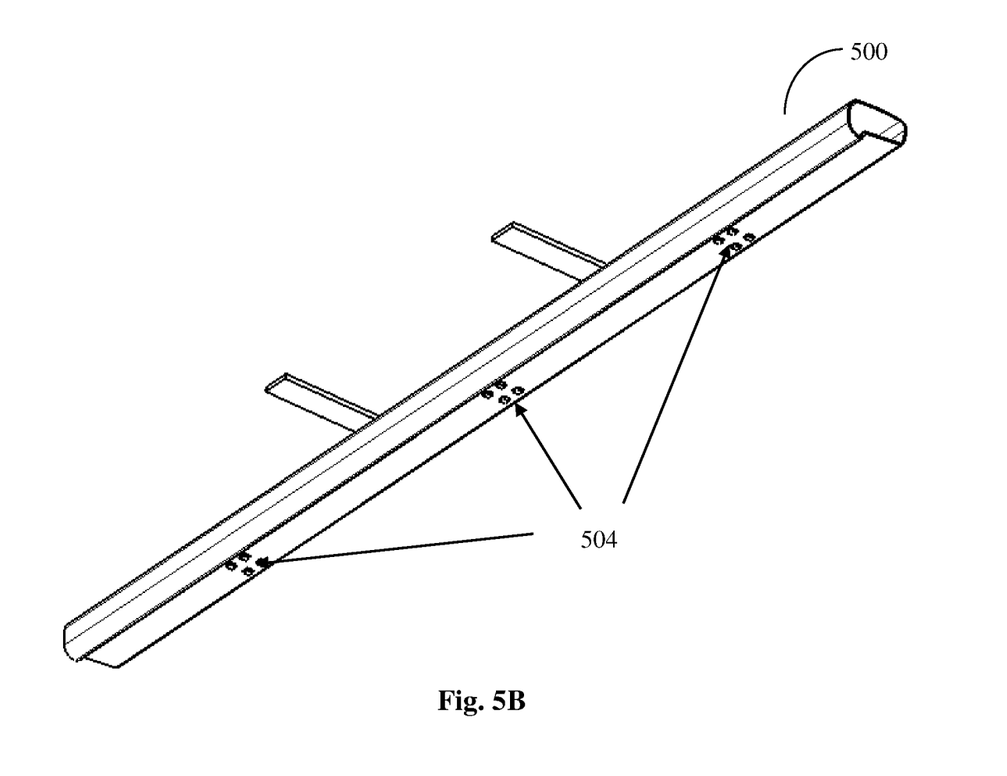

FIGS. 5A-5B represent a schematic illustration of top and bottom view, respectively, of a running board (500) according to one embodiment according to the invention [i.e., consisted of 55% (volume) fiberglass (E-glass) and 45% polyester (volume), wherein 90% of the fibers are fibers of 0° direction and 10% of the fibers are continuous strand mat, 2649 mm length, 72.5 mm height, 122.5 mm width, thickness of 3±0.2 mm and weight of 9.6 lb. (4.35 kg)]. The standard permitted loads in specific locations on the upper side of the board are indicated by arrows 502 in FIG. 5A (top view of the running board). The applied loading mass was about 450 pounds (lb.) (which correspond to about 204 Kg). The running board was fully fixed to a solid support (which simulates the solid vehicle) at the mounting points which are indicated by arrows 504 in FIG. 5B (bottom view of the board). These points define the boundary conditions (BC).

Figure 6A:
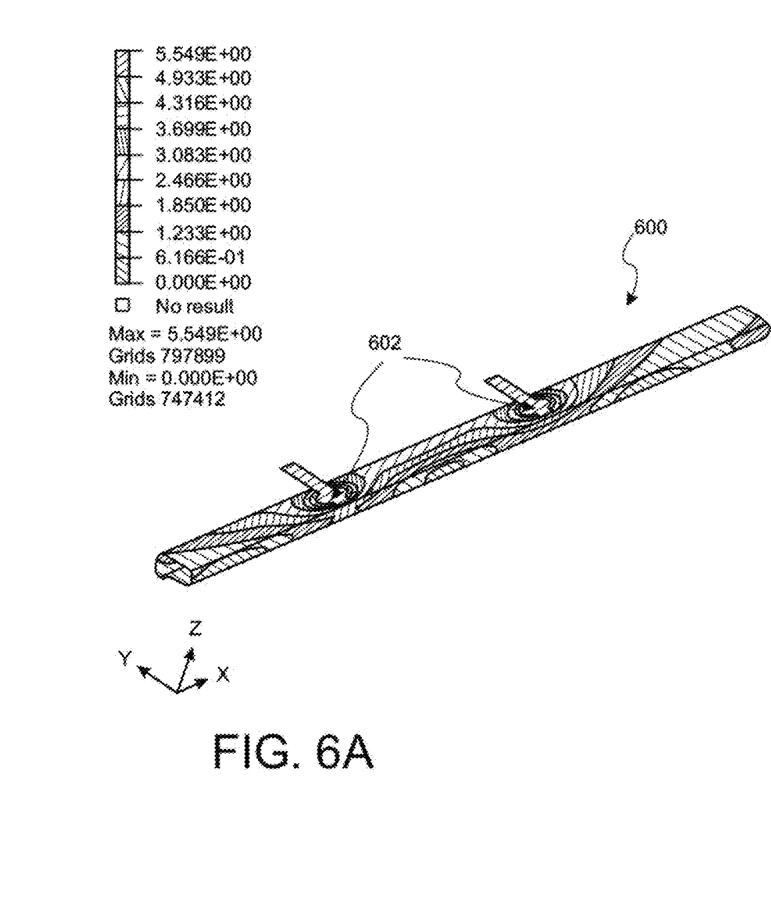
FIGS. 6A-6B represent an exemplary schematic illustration of simulation results conducted on a running board according to some embodiments of the present invention.
Figure 6B:
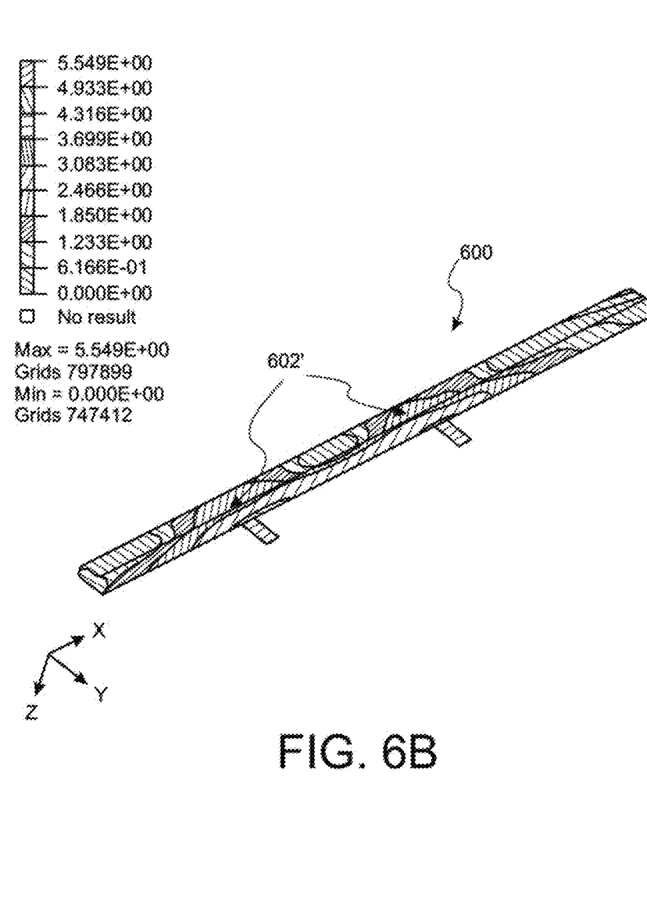

FIGS. 6A-6B represent a schematic illustration of simulation results conducted on a running board (600) according to the aforementioned embodiment of the invention as noted in connection with FIG. 5. FIG. 6A illustrates top of cross section of the running board and FIG. 6B illustrates bottom of cross section of the running board. Each of the points 602 on the running board were loaded with about 450 pounds (lb.). The weight distribution on the board as a result of loading about 450 lb. on both positions 602 is depicted in the FIG. 6A by a color coded scale which results with a red color (maximum deflection) in positions 602. FIG. 6B illustrates the deflection of the board as a result of applying about 450 lb. weight on positions 602; A maximum value of 3.7 mm deflection at positions 602' the bottom of the running board was observed (bottom positions 602' correspond to the top positions 602).

It is noted that while the simulation was performed with maximum load in the designated points, the cross section of the running board was uniform i.e., all the locations on the board may resist the same applied load.

EXAMPLE 2

Testing the Performance of the Running Board—Deflection Test

The running boards with the specific fibers and resins as outcome from the simulation of Example 1 were produced and the performance thereof was tested.

Figure 7:
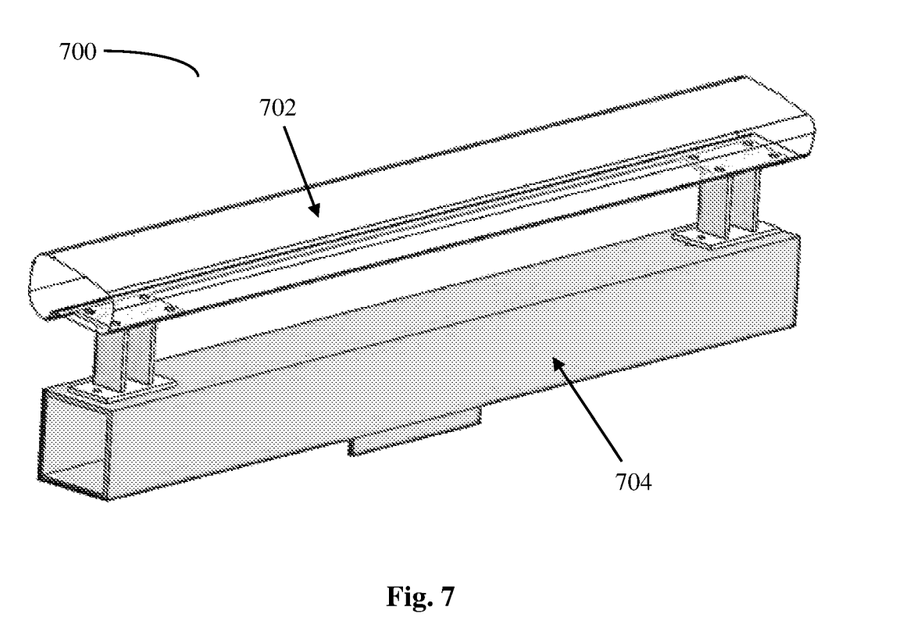
FIG. 7 represents an exemplary schematic illustration of a device designed to measure the effect of applied load on specific positions of a running board according to some embodiments of the present invention.

FIG. 7 represents a schematic illustration of a device (700) which was designed to measure the effect of applied load on specific positions of the running board. The produced running board consisted of 55% (volume) fiberglass (E-glass) and 45% polyester (volume), wherein 90% of the fibers are fibers of 0° direction and 10% of the fibers are continuous strand mat, 2649 mm length, 72.5 mm height, 122.5 mm width, thickness of 3±0.2 mm and weight of 9.6 lb. (4.35 kg). The provided beam (board) 702 was tested using hydraulic test system (MTS). Steel rigid jig (704) was manufactured in order to simulate the actual running board's fixing.

The inventors of the present invention utilized a system (not shown) which was designed to measure the effect of applied load on specific positions on the running board. In particular, to conduct fatigue tests. The board was loaded with about 450 lb. weight at a rate of 100 N/sec utilizing MTS hydraulic test system and via a load distribution plate (see below) while mounted on a steel rigid jig.

Figure 8:
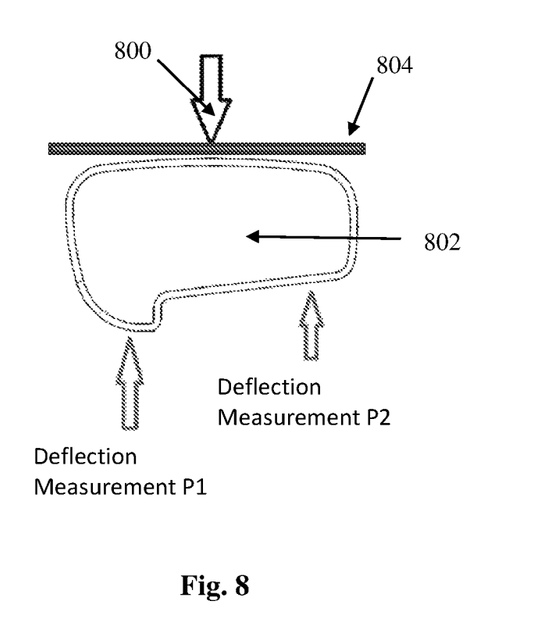
FIG. 8 illustrates an exemplary load applied on an exemplary running board and example of points of deflection measurements according to some embodiments of the present invention.

FIG. 8 illustrates the load, represent by arrow 800, applied on the running board 802 via a load distribution plate 804 of an exemplary size of 60×200 mm on specific position on the running board. The deflection of the bottom face of the board was measured in two points depicted in FIG. 8 as deflection measurements P1 and P2. It is noted that these specific positions are exemplary positions and similar measurements may be conducted on different positions on the tested running board. Three tests were performed on three boards models. The boards were produced on three different days but had identical geometrical and material composition features. The results which are provided in Table 1 illustrate high predictability.

TABLE 1

Deflection results

| Test | Deflection, mm | |
|---|---|---|
| | P1 | P2 |
| 1 | 3.7 | 3.2 |
| 2 | 3.7 | 3.5 |
| 3 | 3.4 | 3.0 |
| Tests Average | 3.6 | 3.2 |
| Simulation* | 3.5 | 3.0 |

EXAMPLE 3

Testing the Performance of the Running Board—Fatigue Test

The running boards with the specific fibers and resins as outcome from the simulation of Example 1 were produced and the performance thereof was tested.

The produced running board consisted of 55% (volume) fiberglass (E-glass) and 45% polyester (volume), wherein 90% of the fibers are fibers of 0° direction and 10% of the fibers are continuous strand mat, 2649 mm length, 72.5 mm height, 122.5 mm width, thickness of 3±0.2 mm and weight of 9.6 lb. (4.35 kg).

The composite running board/beam was tested using hydraulic test system (MTS). Steel rigid jig was manufactured in order to simulate the actual running board's fixing. The beam was joined to the jig using 8 bolts [per Computer Aid Design (CAD) model].

Test Conditions: Displacement controlled loading, provided ca. 2 kN bending load applied at the middle of the beam. Maximal applied force was about 450 lb. Load duration was 70,000 Cycles. Load rate was 5 Hz.

Figure 9:
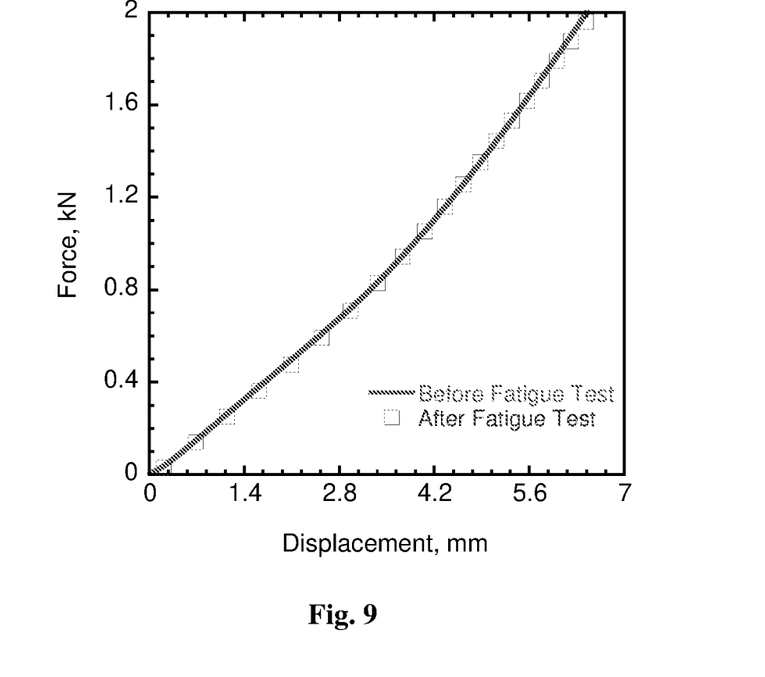
FIG. 9 represents an exemplary stiffness stability of a running board according to some embodiments of the present invention, before and after fatigue test.

FIG. 9 represents the results of the static bending tests before and after the fatigue loading. The inventors of the present invention have illustrated that the stiffness (K=F/D i.e., Force/Displacement) of the running board after applying 70,000 cycles of loads thereon was not affected by the latter. No degradation of the product was observed and the product maintained its initial characteristic features. These results illustrate the beneficial stiffness stability of the running boards according to the present invention.

"Intentionally Left Blank"

Illustrative Embodiments

The following embodiments are illustrative and not intended to limit the claimed subject matter.

Embodiment 1 A running board comprising at least one composite material wherein said running board is produced in one continuous step pultrusion process, wherein the pultrusion process parameters are selected to yield a running board with specific one or more characteristics selected from dimensions, three dimensional shape, light weight/lightness, strength, fatigue, stiffness, rigidity, chemical resistance, fire resistance, reduced sensitivity to corrosion, UV resistance, thermal resistance, bending forces, impact resistance, wear resistance and visibility.

Embodiment 2 The running board of Embodiment 1, wherein said running board is free of any metallic segments or parts.

Embodiment 3 A running board consisting of at least one composite material wherein said running board is produced in one continuous pultrusion step process wherein the pultrusion process parameters are selected to yield a running board with specific one or more characteristics selected from dimensions, three dimensional shape, light weight/lightness, strength, fatigue, stiffness, rigidity, chemical resistance, fire resistance, reduced sensitivity to corrosion, UV resistance, thermal resistance, bending forces impact resistance, wear resistance and visibility.

Embodiment 4 The running board according to any one of Embodiments 1 to 3, wherein said running board is further equipped post said pultrusion process with one or more step pads and/or one or more end cups.

Embodiment 5 The running board according to any one of Embodiments 1 to 4, wherein said running board is further processed post said pultrusion process, wherein the further processing is subjecting said running board to bending forces.

Embodiment 6 The running board according to any one of Embodiments 1 to 5, wherein said running board is further processed post said pultrusion process, wherein the further processing is covering of the running board with a coating layer.

Embodiment 7 The running board according to any one of Embodiments 1 to 6, wherein said running board has one or more structural cavities.

Embodiment 8 The running board according to Embodiment 7, wherein said running board is further processed post the pultrusion process, wherein the further processing is filling the one or more structural cavities of the board with one or more light weigh material.

Embodiment 9 The running board according to Embodiment 8, wherein said light weigh material is selected from polyurethane, balsa, styrene acrylonitrile (SAN) foam, polyvinyl chloride (PVC) foam or polyethylene.

Embodiment 10 The running board according to any one of Embodiments 1 to 9, wherein said running board has a cross-section of a shape selected from round, square, rectangular or triangular.

Embodiment 11 The running board according to any one of Embodiments 1 to 10, wherein said running board has a length of about 600 mm and up to about 3500 mm long.

Embodiment 12 The running board according to any one of Embodiments 1 to 11, wherein said running board has a width of about 50 mm and up to about 300 mm.

Embodiment 13 The running board according to any one of Embodiments 1 to 12, wherein said running board has a height of about 20 mm and up to about 150 mm.

Embodiment 14 The running board according to any one Embodiments 1 to 13, wherein said running board has a thickness of about 1.5 mm and up to about 30 mm.

Embodiment 15 The running board according to any one of Embodiments 1 to 14, wherein said running board has a thickness of 3±0.2 mm.

Embodiment 16 The running board according to any one of Embodiments 1 to 15, wherein said pultrusion process utilizes one or more fibrous material selected from carbon/graphite fiber, fiberglass, aramid fibers, polypropylene fibers or polyethylene.

Embodiment 17 The running board according to Embodiment 16, wherein said fiberglass is selected from E-glass, S-glass, S2-glass or C-glass.

Embodiment 18 The running board according to Embodiment 17, wherein said fiberglass is E-glass.

Embodiment 19 The running board according to any one of Embodiments 16 to 18, wherein the fibrous material is of any form or shape.

Embodiment 20 The running board according to Embodiment 19, wherein the fibrous material is provided in one or more shapes of textiles.

Embodiment 21 The running board according to Embodiment 20, wherein said textile is selected from stitched long fiber math, long fiber math, continuous strand mat, chopped strand mat (CSM) or chopped reinforcements, woven reinforcements, continuous roving reinforcements, knitted reinforcements, surface veils, carbon veils or non-crimp fabrics (NCF).

Embodiment 22 The running board according to Embodiment 21, wherein said textile is NCF.

Embodiment 23 The running board according to Embodiment 22, wherein the orientation of the fibers in said NCF are one or more of 0° angle and any angle between about 20° to about 90°.

Embodiment 24 The running board according to any one of Embodiments 16 to 23, wherein the fibers of said fibrous material are provided in a single layer form.

Embodiment 25 The running board according to any one of Embodiments 16 to 23, wherein the fibers of said fibrous material are provided in multi stacked layers form.

Embodiment 26 The running board according to any one of Embodiments 16 to 23, wherein the fibers of said fibrous material are provided in a 4 stacked layers wherein each fiber consists of about 4000 filaments.

Embodiment 27 The running board according to any one of Embodiments 1 to 26, wherein said pultrusion process utilizes one or more resins selected from epoxy, polyurethane, polyester, chlorendic polyester resin, dicyclopentadiene (DCPD), vinyl ester or phenolic ester. p0 Embodiment 28 The running board according to Embodiment 27, wherein said resin is polyester.

Embodiment 29 The running board according to Embodiment 28, wherein said polyester is selected from orthophthalic polyester, terephthalic polyester or isophthalic polyester.

Embodiment 30 The running board according to Embodiment 28, wherein said polyester is chlorendic polyester.

Embodiment 31 The running board according to Embodiment 27, wherein said resin is vinyl ester.

Embodiment 32 The running board according to Embodiment 27, wherein said resin is a thermoset resin.

Embodiment 33 The running board according to Embodiment 27, wherein said resin is a thermoplastic resin.

Embodiment 34 The running board according to any one of Embodiments 27 to 33, wherein said resin has a viscosity of between about 300 cp to about 1000 cp.

Embodiment 35 The running board according to any one of embodiments 27 to 33, wherein said resin is compatible with temperatures of up to about 70° C.

Embodiment 36 The running board according to any one of Embodiments 27 to 33, wherein said resin is compatible with temperatures of up to about 90° C.

Embodiment 37 The running board according to any one of Embodiments 27 to 33, wherein said resin is compatible with temperatures of up to about 120° C.

Embodiment 38 The running board according to any one of Embodiments 27 to 33, wherein said resin is compatible with temperatures of up to about 180° C.

Embodiment 39 The running board according to any one of Embodiments 27 to 33, wherein said resin is compatible with temperatures of up to about 215° C.

Embodiment 40 The running board according to any one of Embodiments 1 to 39, wherein said at least one composite material consists of one or more fibrous materials selected from carbon/graphite fiber, fiberglass/glass fiber, aramid fibers, poly-propylene fibers or polyethylene and one or more resins selected from epoxy, polyurethane, polyester (orthophthalic, terephthalic, isophthalic), chlorendic polyester resin, dicyclopentadiene (DCPD), vinyl ester or phenolic ester.

Embodiment 41 The running board according to Embodiment 40, wherein said at least one composite material consists of fiberglass and polyester.

Embodiment 42 The running board according to Embodiment 40 or 41, wherein said fiberglass is E-glass.

Embodiment 43 The running boards according to Embodiment 42, wherein about 90% of the fibers are fibers of 0° direction and about 10% of the fibers are continuous strand mat.

Embodiment 44 The running board according to any one of Embodiments 41 to 43, wherein the fiberglass constitutes about 55% of the running board volume and the polyester constitutes about 45% of the running board volume.

Embodiment 45 The running board according to Embodiment 40, wherein said at least one composite material consists of E-glass and vinyl ester.

Embodiment 46 A process for manufacturing a running board, the process comprising pultruding at least one composite material under preselected pultrusion conditions, to afford a running board consisting said composite material and having a predetermined shape and size.

Embodiment 47 A process for manufacturing a running board according to any one of Embodiments 1 to 45, the process comprising pultruding at least one composite material under preselected pultrusion conditions, to afford a running board consisting said composite material and having a predetermined shape and size.

Embodiment 48 The process according to Embodiment 46 or 47, wherein at least one fibrous material, at least one resin material, and optionally at least one additive are combined to afford said composite material.

Embodiment 49 The process according to Embodiment 46 or 47, wherein the preselected pultrusion conditions are one or more of temperature and pulling rate.

Embodiment 50 The process according to any one of Embodiments 46 to 49, wherein in said process the pultrusion temperature being the highest temperature utilized along the pultrusion process is selected between about 70° C. and about 215° C.

Embodiment 51 The process according to Embodiment 50, wherein the temperature is not higher than about 90° C., or about 120° C. or not higher than about 180° C.

Embodiment 52 The process according to any one of Embodiments 46 to 51, wherein said process comprises determining or setting the pultrusion temperature based on the selection of the at least one resin.

Embodiment 53 The process according to any one of Embodiments 46 to 52, wherein the preselected pultrusion conditions are selected or adapted or modified to meet one or more characteristics of the final running board product, wherein said one or more characteristics are selected from strength, fatigue, stiffness, rigidity, chemical resistance, fire resistance, reduced sensitivity to corrosion, UV resistance, thermal resistance, bending forces, impact resistance, wear resistance and visibility.

The invention claimed is:

1. A running board, comprising:
at least one composite material;
wherein the entire running board is produced in a one continuous step pultrusion process;
wherein the one continuous step pultrusion process parameters are pre-selected to provide the running board with the following predetermined characteristic features: dimensions, three dimensional shape, light weight/lightness, strength, fatigue, stiffness, rigidity, chemical resistance, fire resistance, reduced sensitivity to corrosion, UV resistance, thermal resistance, bending forces, impact resistance, wear resistance, and visibility.

2. The running board according to claim 1, wherein said running board is free of any metallic segments or parts.

3. The running board according to claim 1, wherein said running board consists of the at least one composite material.

4. The running board according to claim 1, wherein said running board is further processed post said one continuous step pultrusion process, wherein the further processing is subjecting said running board to bending forces and/or covering of the running board with a coating layer.

5. The running board according to claim 1, wherein said running board has one or more structural cavities, and optionally wherein said running board is further processed post the one continuous step pultrusion process, wherein the further processing is filling the one or more structural cavities of the running board with one or more light weigh material, and further optionally wherein said light weight material is selected from at least one of polyurethane, balsa, styrene acrylonitrile (SAN) foam, polyvinyl chloride (PVC) foam, or polyethylene.

6. The running board according to claim 1, wherein said one continuous step pultrusion process utilizes one or more fibrous material selected from at least one of carbon/graphite fiber, fiberglass, aramid fibers, poly-propylene fibers, or polyethylene, wherein said one or more fibrous material form part of said at least one composite material.

7. The running board according to claim 6, wherein said fiberglass is selected from at least one of E-glass, S-glass, S2-glass, or C-glass.

8. The running board according to claim 7, wherein the fibrous material is provided in one or more shapes of textiles, optionally wherein the textile is selected from at least one of stitched long fiber math, long fiber math, continuous strand mat, chopped strand mat (CSM) or chopped reinforcements, woven reinforcements, continuous roving reinforcements, knitted reinforcements, surface veils, carbon veils, or non-crimp fabrics (NCF).

9. The running board according to claim 1, wherein said one continuous step pultrusion process utilizes one or more resins selected from at least one of epoxy, polyurethane, polyester, chlorendic polyester resin, dicyclopentadiene (DCPD), vinyl ester, or phenolic ester.

10. The running board according to claim 9, wherein said resin is a polyester selected from at least one of orthophthalic polyester, terephthalic polyester, or isophthalic polyester.

11. The running board according to claim 9, wherein said resin is a thermoset resin or a thermoplastic resin.

12. The running board according to claim 1, wherein said at least one composite material consists of one or more fibrous materials selected from at least one of carbon/graphite fiber, fiberglass/glass fiber, aramid fibers, polypropylene fibers or polyethylene and one or more resins selected from epoxy, polyurethane, polyester (orthophthalic, terephthalic, isophthalic), chlorendic polyester resin, dicyclopentadiene (DCPD), vinyl ester, or phenolic ester.

13. The running board according to claim 12, wherein said at least one composite material consists of fiberglass and polyester.

14. The running board according to claim 12, wherein said fiberglass is E-glass and wherein about 90% of the fibers are fibers of 0° direction and about 10% of the fibers are continuous strand mat.

15. The running board according to claim 13, wherein the fiberglass constitutes about 55% of the running board volume and the polyester constitutes about 45% of the running board volume.

16. The running board according to claim 12, wherein said at least one composite material consists of E-glass and vinyl ester.

17. A process for manufacturing a running board of at least one composite material, the process comprising:
selecting pultrusion process parameters such as to provide a one-piece composite running board produced from said at least one composite material with the following predetermined characteristic features: dimensions, three dimensional shape, light weight/lightness, strength, fatigue, stiffness, rigidity, chemical resistance, fire resistance, reduced sensitivity to corrosion, UV resistance, thermal resistance, bending forces, impact resistance, wear resistance, and visibility; and
pultruding said at least one composite material under said pultrusion process parameters to produce said one-piece composite running board.

18. The process according to claim 17, wherein said running board is the running board according to claim 1.

19. The process according to claim 17, wherein at least one fibrous material, at least one resin material, and optionally at least one additive are combined to afford said at least one composite material.

20. The process according to claim 17, wherein said pultrusion process parameters are selected from temperature and pulling rate, optionally wherein the temperature is selected between about 70° C. and about 215° C.

* * * * *